United States Patent
Kelm et al.

[19]

[11] Patent Number: 6,161,801
[45] Date of Patent: Dec. 19, 2000

[54] METHOD OF REDUCING WIND GUST LOADS ACTING ON AN AIRCRAFT

[75] Inventors: Roland Kelm, Hamburg; Michael Grabietz, Schmallenberg, both of Germany

[73] Assignee: DaimlerChrysler Aerospace Airbus GmbH, Hamburg, Germany

[21] Appl. No.: 09/303,264

[22] Filed: Apr. 30, 1999

[30] Foreign Application Priority Data

Apr. 30, 1998 [DE] Germany .............................. 198 19 341

[51] Int. Cl.⁷ .................................................. B64C 13/16
[52] U.S. Cl. .......................................... 244/76 C; 244/195
[58] Field of Search ................................ 244/35 R, 75 R, 244/76 R, 76 C, 82, 90 R, 90 A, 203, 215, 194, 195, 48

[56] References Cited

U.S. PATENT DOCUMENTS

| | | | |
|---|---|---|---|
| 2,802,630 | 8/1957 | Birchill et al. .............................. | 244/35 |
| 3,589,648 | 6/1971 | Gorham et al. . | |
| 4,388,777 | 6/1983 | Hermann et al. .......................... | 244/35 |
| 4,479,620 | 10/1984 | Rogers et al. .......................... | 244/75 R |
| 4,568,043 | 2/1986 | Schmittle .................................. | 244/48 |
| 4,651,955 | 3/1987 | Krafka . | |
| 4,725,020 | 2/1988 | Whitener ................................ | 244/76 C |
| 4,796,192 | 1/1989 | Lewis . | |
| 5,082,207 | 1/1992 | Tulinius .................................. | 244/76 R |
| 5,186,416 | 2/1993 | Fabre et al. . | |
| 5,681,014 | 10/1997 | Palmer ...................................... | 244/48 |

FOREIGN PATENT DOCUMENTS

| | | |
|---|---|---|
| 3416719 | 11/1985 | Germany . |
| 1086938 | 10/1967 | United Kingdom . |
| 2140364 | 11/1984 | United Kingdom . |

*Primary Examiner*—Galen L. Barefoot
*Attorney, Agent, or Firm*—W. F. Fasse; W. G. Fasse

[57] ABSTRACT

A method of reducing the bending moment effect of wind gust loads acting on the wing of an aircraft involves adjusting the aerodynamic configuration of the wing so as to alter the distribution of lift generated by the wing during phases of flight in which critical wind gusts are expected to occur. Particularly, during climb and descent phases of flight below cruise altitude, the lift generated by outboard portions of the wings is reduced while the lift generated by inboard portions of the wings is increased. Thereby, the 1 g basis load acting on the outboard portions of the wings is reduced, and consequently the total load applied to the outboard portions of the wings, resulting from the 1 g basis load plus the additional wind gust load, is correspondingly reduced. This leads to a reduction of the bending moments effective on the wings, and of any rolling moment effective on the aircraft. The required adjustment of the lift distribution is preferably achieved by deflecting the ailerons of both wings symmetrically upward and/or deflecting the flaps of both wings symmetrically downward during climb and descent. The adjustment of the wing configuration is carried out dependent only on flight parameters such as the altitude, speed and gross weight, and does not require rapid sensing of the occurrence of a wind gust and rapid actuation of control surfaces to try to instantaneously counteract a wind gust as it occurs.

20 Claims, 1 Drawing Sheet

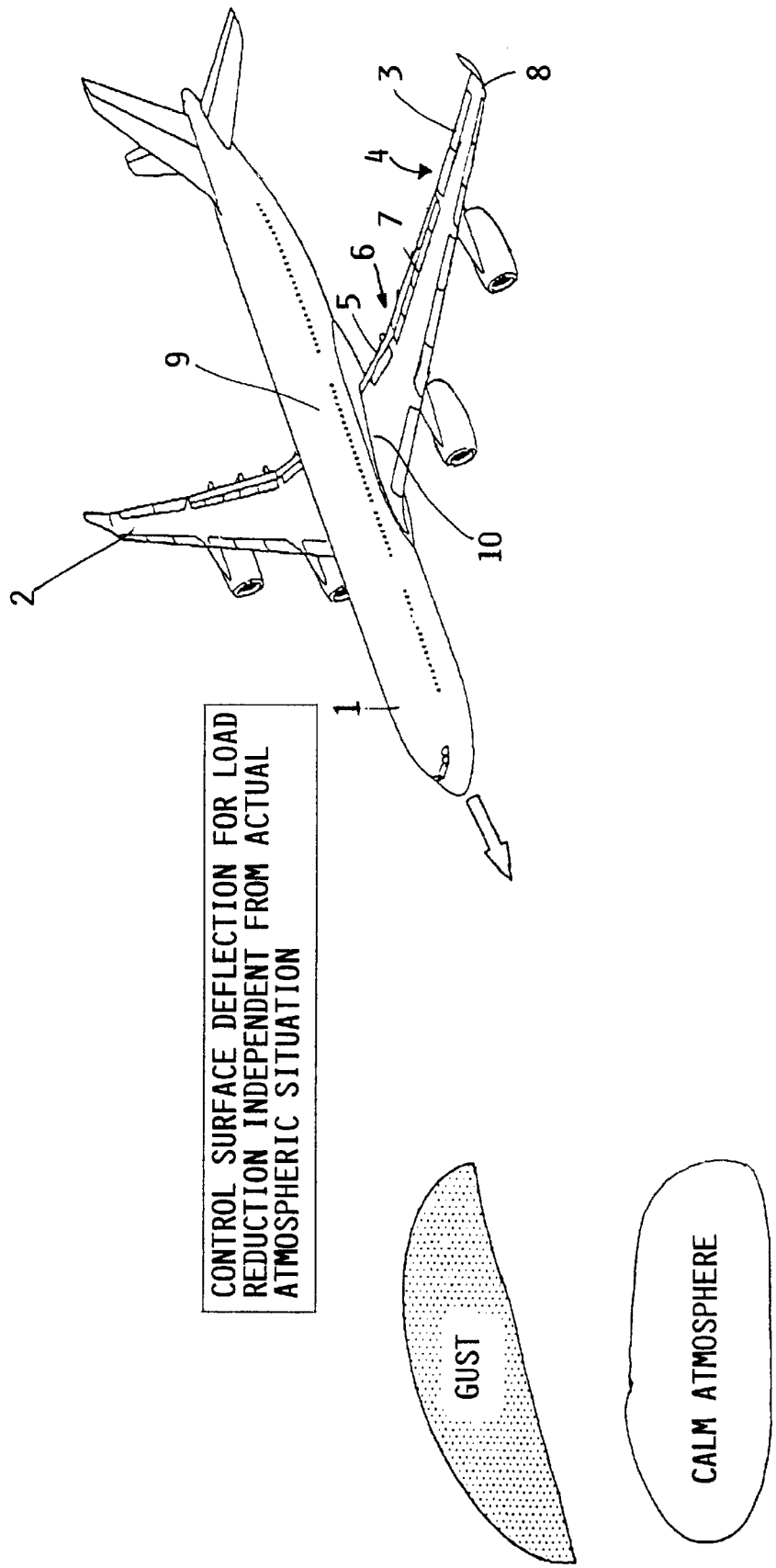

METHOD OF REDUCING WIND GUST LOADS ACTING ON AN AIRCRAFT

PRIORITY CLAIM

This application is based on and claims the priority under 35 U.S.C. §119 of German Patent Application 198 19 341.6, filed on Apr. 30, 1998, the entire disclosure of which is incorporated herein by reference.

1. Field of the Invention

The invention relates to a method for reducing wind gust loads acting on an aircraft by selectively positioning control surfaces of the wings of the aircraft in order to reduce the total load acting on the wings, which includes a gust load component.

2. Background Information

The total load acting on an aircraft, and particularly the total load resulting in a bending moment applied to an aircraft wing, is given by the sum of the 1 g basis load, the additional load arising from the influence of wind gusts, and the additional load resulting from maneuvers being carried out by the aircraft. The total 1 g basis load is represented by the lift forces generated by the aircraft in order to lift the weight of the aircraft, and is substantially constant in total for stable flight.

Among the variable loads acting on the aircraft during flight, there are significant distinctions between the maneuvering loads and the wind gust loads, among other things. In contrast to the maneuvering loads, typical wind gust loads are characterized by substantial rapid variations in magnitude and direction. These sudden variations are caused in part because an upward or downward wind gust will induce a very rapid variation of the effective angle of attack of the wings of the aircraft, especially at high flight speeds. Such sudden variations in the angle of attack correspondingly cause sudden variations in the instantaneous lift, and consequently cause sudden variations in the gust induced loading of the aircraft and particularly the wings. On the other hand, maneuver load variations are relatively slow or gradual, because they are induced by relatively slow control surface deflections or flight attitude and configuration changes, for example resulting in a maneuvering load transitioning from 1 g to 2.5 g.

Since the maneuvering load variations are more gradual, and they can be predicted or preempted because they result from intentional active maneuvering control measures, it has been possible in the prior art to successfully reduce the resulting maneuvering loads. For example, a system for reducing the maneuvering loads is already effectively and successfully being used in the Airbus A340 aircraft. This known system is able to reduce the maneuvering loads to the same level as the maximum wind gust loads, so that it has been possible to reduce the strength of the wing structures and thereby advantageously reduce the weight of the wings.

On the other hand, while the prior art has proposed systems for reducing wind gust loads, such systems have not come into practical use. That is because such systems have all been intended to actively sense and counteract the effects of a wind gust as it occurs so as to reduce the actual instantaneous wind gust loading, and operation in that manner places very high demands on such a system in actual practice. Namely, since the wind gusts cause very rapid and sudden variations in the loads applied to the wings, the sensors must react very rapidly and precisely, and the active measures such as actuation of control surfaces to counteract such wind gust loads must be similarly rapid.

When an aircraft flies into a wind gust, or generally when a wind gust influences an aircraft, additional loads are induced, whereby the total load is given by the 1 g basis load plus the additional load caused by the wind gust, for example as represented by the conceptual equation:

$$\text{total load (with gust)} = 1 \text{ g basis load} + \Delta \text{ gust load}.$$

This equation ignores the maneuvering loads, or assumes that the maneuvering loads are essentially zero or have been counteracted at the pertinent time. The dominant wind gust loads that have the greatest influence on aircraft and particularly aircraft wings result from vertical wind gusts, e.g. updrafts or downdrafts. Such vertical wind gusts generally arise at flight altitudes below typical cruise flight altitudes of present day commercial airliners. Thus, it can be concluded from the above equation, that the greatest total loads on a commercial transport aircraft being subjected to wind gusts arise at flight altitudes below cruise altitude, and particularly during the climb and descent phases of flight.

A known wind gust reduction system is employed in the Airbus A320 aircraft. This known system uses symmetrical deflections of the ailerons to counteract the effects of a wind gust. For example, when an Airbus A320 aircraft flies into an upward wind gust, which causes an upward acceleration of the aircraft exceeding a prescribed threshold, then the countering system actuates the ailerons on both wings to be symmetrically deflected upwardly. The upward deflection of both ailerons reduces the lift generated by the wings, so as to reduce or counteract the effects of the updraft, and particularly the increased angle of attack induced by the updraft and the increased lift resulting therefrom. In corresponding fashion, when the aircraft is subjected to a downdraft, the ailerons of both wings are symmetrically deflected downward to increase the lift and counteract the effects of the downdraft. Thus, the known system aims to detect a wind gust as it is occurring, and in the same moment alters the wing configuration to reduce the additional load imposed by the wind gust.

Since the additional loads induced by the wind gusts can have very rapid variations or gradients in time, it is necessary to achieve very rapid aileron deflection speeds in order to successfully carry out the known method of gust counteracting. As a result, the counteracting system becomes more complicated and costly, and also leads to an increased weight of the system and the aircraft. Furthermore, the known systems require the use of a complicated system of rapidly reacting and highly sensitive sensors for instantly detecting the presence, magnitude and effect of a wind gust, in order to then be able to rapidly counteract the gust.

The known system uses a symmetrical deflection of the ailerons, because it is especially important to counteract the influence of the wind gusts on the outer portions of the wings, i.e. the portions of the wings generally near the wing tips, as opposed to the inner portions of the wings generally near the wing roots. Namely, the influence of a wind gust acting on the outer portion of a wing near the wing tip exerts a much higher bending moment on the wing and therefore makes much higher demands on the wing structure, when compared to the same gust loading applied to the inner portion of the wing near the wing root. Moreover, a wind gust acting on the outer wing portion of only one wing, without being balanced by a similar wind gust effect on the other wing, will exert a much greater rolling moment onto the aircraft, in comparison to the same wind gust loading applied to the inner portion of a wing near the wing root.

For the above reasons, it is especially important to counteract the influences of wind gusts at the outer wing portions, i.e. near the wing tips rather than near the wing roots. In this regard, the above equation defining the total load as the sum of the 1 g-basis load plus the additional load induced by a wind gust can be evaluated incrementally along the wing span direction, i.e. at respective successive profile sections of the wing. It is thus recognized that it is especially important to reduce the portion of the total resultant load that is effective on the outer portions of the wings, while it is not as important to reduce the portion of the total resultant load that is effective on the inner portions of the wings.

SUMMARY OF THE INVENTION

In view of the above, it is an object of the invention to provide a method of reducing the influence of wind gust loads acting on an aircraft, which avoids the need for the rapid actuation or deflection of actuators and control surfaces as was necessary according to the prior art. It is a further object of the invention to provide such a method which avoids the need for rapidly and accurately sensing the occurrence of a wind gust in order to then rapidly counteract the wind gust. The invention further aims to avoid or overcome the other disadvantages of the prior art, and to achieve additional advantages, as apparent from the present specification.

The above objects have been achieved in a method of reducing wind gust loads acting on an aircraft, according to the invention, wherein the lift profile of the wings is varied over the wing span in order to reduce the total resulting load by reducing the 1 g basis load, especially at the outer portions of the wings, while correspondingly increasing the 1 g-basis load on the inner portions of the wings. In other words, the lift generated by the outer portions of the wings is reduced, while the lift generated by the inner portions of the wings is increased. This redistribution of the lift generation pattern of the wings is carried out especially during the phases of flight in which wind gusts are more commonly expected to occur, i.e. during climb from take-off up to the cruise flight altitude, and during descent from the cruise flight altitude to landing.

The present inventive method totally diverges away from the prior art concepts of wind gust load reduction. Rather than trying to sense the occurrence of a particular wind gust and then actively counteract that wind gust as in the prior art, the present method does not involve sensing and responding to particular wind gusts. Instead, the invention involves a preemptive or prophylactic redistribution of lift over the wing, which is not particularly or directly responsive to an actually occurring wind gust. Rather, the wing is reconfigured so that it is not as strongly influenced by any wind gusts that do occur.

Moreover, the present invention takes a totally different approach as compared to the prior art for reducing the total wing loading and particularly wing bending loading that arises when a wind gust acts on the wing. As discussed above, the total load at the time of a wind gust includes a first component represented by the 1 g basis load, plus a second component represented by the additional load induced by the wind gust itself. The prior art systems and methods aim to actively sense and counteract the second component of this equation, i.e. the variable additional load induced by the wind gust itself. In contrast, the present inventive method essentially ignores the active variations in the wind gust loads giving rise to the second component of the equation, and instead reduces the first component, namely the 1 g basis load, along the outer portions of the wings where it is most important to reduce the total loading that results during a wind gust situation. By reducing the 1 g basis load on the outer portions of the wings, the inventive method reduces the total resulting load on the outer portions of the wings without needing to rapidly counteract any instantaneously existing wind gust load component. In this manner, the bending moments applied to the wings as well as any rolling moments applied to the aircraft as a result of the wind gusts are effectively reduced.

BRIEF DESCRIPTION OF THE DRAWINGS

In order that the invention may be clearly understood, it will now be described in connection with example embodiments, and with reference to the accompanying single drawing FIGURE, which schematically shows an aircraft being operated according to the invention, with proper control surface deflection for prophylactic wind gust load reduction regardless of the actually existing atmospheric condition (wind gust or calm air).

DETAILED DESCRIPTION OF PREFERRED EXAMPLE EMBODIMENTS AND OF THE BEST MODE OF THE INVENTION

As shown in the single drawing FIGURE, the inventive reconfiguration or redistribution of the lift generation along the wing 2 of an aircraft 1 span of the wings can be achieved by correspondingly actuating and deflecting control surfaces such as the ailerons 3 provided at the outer portions 4 of the wings 2 and the flaps 5 provided at the inner portions 6 of the wings 2. Spoilers 7 at either of these locations can also be used. As a further variation, the inventive method can be used in connection with adaptive wings or wings having a variable camber or a twistably variable angle of attack, by actively or passively varying or adapting the configuration of such wings to achieve the required distribution of the lift characteristic.

Throughout this specification, the terms "outer portion" and "inner portion" of the wing are merely relative, and can refer to an outer half and an inner half of a wing, or an outer third and an inner third of a wing, or an outer two thirds and an inner one third of a wing, or other variations. In any event, the outer portion 4 is nearer to the wing tip 8 and distal from the fuselage 9, while the inner portion 6 is proximal to the fuselage 9 and further from the wing tip 8. Especially, the outer portion 4 includes the wing tip 8 and the inner portion 6 includes the wing root.

The actuators for carrying out such variations in the wing configuration can be any known actuators, without requiring special high-speed capabilities, and are controlled and actuated dependent on such parameters as the flight altitude, the flight speed, and the gross flight weight of the aircraft during climb and during descent. The present system and method can entirely omit and avoid the use of sensors for detecting wind gust effects, such as vertical acceleration sensors and wing bending moment sensors.

One advantage of the invention in comparison to the above described conventional methods is that a deflection of the control surfaces is carried out independently of whether or not a wind gust is actually present and influencing the aircraft, as schematically represented in the single drawing FIGURE. Since the required degree of deflection of the ailerons, for example, during the climb or descent phases of flight is dependent essentially only on the flight altitude, the flight velocity and the gross flight weight of the aircraft, this proper deflection can be achieved relatively slowly based on the known parameters. Particularly, it is not necessary to actuate and deflect the ailerons and/or flaps any more rapidly than is required for known maneuvering load reduction systems that are already in use and that have been discussed above.

The deflection of the ailerons and/or flaps according to the invention causes an increased aerodynamic drag. This is not a serious problem, however. Since the maximum wind gust loads typically occur at flight altitudes below normal cruise flight altitude, the inventive measures are generally employed only during climb and descent. Particularly, the inventive measures are employed during the majority, or most (e.g. at least 75%), or even all of the climb and descent phases, with the control surfaces continuously positioned in the gust-alleviating configuration. Once the aircraft reaches cruise altitude and flies substantially at that cruise altitude (i.e. within normal tolerance of and deviation from an assigned flight level), the control surfaces are returned to their typical cruise flight positions in a "clean" cruise configuration, in order to reduce the aerodynamic drag to the minimum.

The drag penalty during climb and descent is outweighed by the advantages of the invention, as follows. Since the invention reduces the peak total wing loads resulting when wind gusts act on the wing during climb and descent, to approximately the same lower level as the gust loads typical during cruise flight, it is advantageously possible to reduce the structural strength of the wings and thereby reduce the overall weight of the aircraft. This in turn achieves a reduced cost of manufacturing the aircraft and reduced fuel consumption. This advantage is especially dominant for long range cruise flights in which the short term penalty of increased aerodynamic drag during climb and descent is outweighed by the fuel savings during the long range cruise flight with the wings in a "clean" configuration.

A particular embodiment of the invention involves controlling the deflection of the actuators and/or the control surfaces during the climb and descent phases of flight so as to optimize the distribution of 1 g lift over or along the wing span of the wings while simultaneously minimizing the additional aerodynamic drag caused by the deflection of the control surfaces. In other words, the control surfaces including flaps and/or ailerons are deflected in such a configuration and to such an extent so as to just achieve the required reduction of the total wing loading, especially along the outer portions of the wings, while minimizing the aerodynamic drag for achieving such a lift distribution. This can be achieved by setting the control surfaces to prespecified positions based on known flight parameters as derived empirically or from test flight data, or by carrying out an automatic self-optimizing iterative process of deflecting the control surfaces to achieve the required lift distribution while evaluating the aerodynamic drag being produced by the instantaneous control surface configuration, and then readjusting the control surface configuration so as to minimize the drag while still achieving the required lift distribution.

A particularly preferred control surface configuration according to the invention involves the ailerons provided in the outer portions of both wings being deflected symmetrically upward and/or the flaps provided on the inner portions of both wings being deflected symmetrically downward. With this configuration, the downwardly deflected flaps increase the lift generated by the inner portions of the wings, while the upwardly deflected ailerons decrease the lift generated by the outer portions of the wings. Alternatively, if only the ailerons are deflected upward, then the flight attitude can be altered to provide a greater angle of attack, thereby generating greater lift on the inner portions of the wings. Conversely, if only the flaps are deflected downward, then the flight attitude can be altered to provide a reduced angle of attack, thereby generating reduced lift on the outer portions of the wings. In any event, the total lift generated by the wing remains the same, but the overall wing configuration is less influenced by wind gusts that might occur. However, such a wing configuration causes an aerodynamic drag penalty as discussed above, and should only be maintained when wind gusts are expected to occur, for example generally during climb to and descent from cruise altitude. The drag-counteracting configuration according to the invention can also be used during portions of the cruise flight, for example if advance indications of expected wind gusts in a certain area along the flight path have been received.

The inventive method can be used in connection with adaptive wings or wings having a variable camber or a twistably adjustable angle of attack, by which the local lift characteristic along the wing can be adjusted. If the camber of the wing is continuously or incrementally adjustable along the wing span direction, the present inventive method achieves a very effective control and adjustment of the lift distribution along the wing span so as to reduce the overall resulting loads when gusts act on the wing.

It is further advantageous that the invention not only reduces the maximum arising loads during wind gust influences, but also simultaneously reduces the fatigue loads applied to the wings during climb and descent phases of flight. Thus, all components of the wing structure, including the components such as the upper shell of the wing that are dimensioned in view of the ultimate loads, as well as the components such as the lower shell of the wing that are dimensioned based on the fatigue loads, can be constructed in a lightweight manner and thus contribute to the overall weight savings.

The present inventive method may advantageously be used in essentially any existing aircraft in which it is possible to carry out a symmetrical deflection of the ailerons. For example, present day aircraft having a "fly-by-wire" flight control system are able to carry out a symmetric deflection of the ailerons and are easily programmable or retrofittable to carry out the inventive method. Such conventional aircraft already include all necessary systems and all necessary components for carrying out the method, and thus will not require any additional equipment or installation costs.

An additional advantage of the invention is that the practical application and utilization of the invention, especially in commercial transport aircraft, is not expected to face any certification or approval problems, because the system is physically comparable to maneuvering load reduction systems that are already in use in present day aircraft. It should also be understood that the normal control actuation inputs can be readily superimposed on the control surface deflections called for according to the invention. In other words, the normal functions of the ailerons, for example, are not inhibited by the method of the invention. Instead, a substantially continuous upward deflection bias according to the invention is superimposed with the usual smaller varying deflections required for roll control of the aircraft. Moreover, a system for carrying out the present method is inherently safe, and there is no safety risk even in the case of a complete failure of the system. Namely, if the wind gust load reduction system fails, the wing and the aerodynamic control thereof would continue to function as usual, but without the wind gust load reduction features. It would thus simply be necessary to reduce the flight speed in order to reduce or limit the effects of wind gust loads on the wings. It is advantageous that the employment of such a system has no negative effect on the safety, reliability and maneuverability of an aircraft.

Further embodiment details of the invention provide that the actuators or control surfaces comprise active or passive systems and devices for varying the wing lift distribution pattern. Such systems can be utilized according to the invention independently of whether the systems are actuated mechanically, hydraulically, electrically, pneumatically, or by some other means.

It should be understood that the 1 g basis load corresponds to the instantaneous weight of the aircraft, when viewed on an overall or total basis. This load arises when the lift generated by the wings compensates or counterbalances the weight of the aircraft. When the 1 g basis load is viewed incrementally on different portions of the wing in the wing span direction, it should be understood that the 1 g basis load can be reduced on some wing portions while it is correspondingly increased on other wing portions to provide the same overall or total 1 g basis load, which always corresponds to the weight of the aircraft. Thus, when the lift generated by one portion, e.g. the outer portion of the wing, is reduced and thereby the 1 g basis load on this outer portion of this wing is correspondingly reduced, then the lift generated by at least one other portion of the wing must be correspondingly increased. For example the lift generated by the inner portions of the wings is increased by deflecting the flaps or by increasing the effective angle of attack, in order to maintain the same overall lift and thereby maintain the flight altitude of the aircraft.

By adjusting the lift distribution of the wings in the above manner, the bending moment distribution over the span width of the wings is also changed according to the invention, in order to reduce the total bending moment that acts on the wings as the sum of the 1 g lift bending moments and the wind gust bending moments. This can be achieved by adjusting discrete control surfaces such as the ailerons on the outer portions of the wings and flaps on the inner portions of the wings, or by adjusting an adaptive wing or a bendable or twistable wing in which different portions of the wing can be set to have different angles of attack or in which the wing has a bendable adjustable camber. In any event, these adjustments according to the invention are carried out rather slowly and then the adjusted positions are continuously maintained with a given configuration for relatively long periods of time, for example during most or essentially all of the climb and descent phases of a flight, without readjusting the configuration.

In contrast, the conventionally known systems for reducing wind gust loads all require that the flap or aileron deflections are respectively carried out exactly at the moment in which a wind gust or some other additional load arises on the wings. The control system required for carrying out such conventional methods requires sensors that detect, measure and signal the occurrence of a wind gust or other additional load. For example, acceleration sensors are used in this context in order to activate the deflection of the flaps or ailerons when a prescribed vertical acceleration is exceeded. In view of the very rapid flap or aileron deflections that are necessary, this requires a rather complicated, robust and expensive sensing, control, evaluation and actuation system, especially since the wind gusts or other additional loads will already be effective on the aircraft before the initiation of the control or counteracting measures. All of these disadvantages associated with the conventional known systems are avoided by the inventive method. Namely, the present method does not require an additional sensor system, and the flap and aileron system as well as the actuators therefor do not require any modifications because a very rapid control surface deflection is not necessary. As mentioned above, the flap and aileron deflections carried out according to the inventive method are achieved proactively and preventively, and are not carried out rapidly only at the very moment in which a wind gust or other additional load arises.

The inventive method is based on the recognition that the critical maximum wind gust loads that generally are the basis of the calculation and dimensioning of the aircraft structure typically arise at altitudes below the normal cruise flight altitude. The invention further draws on the recognition that the total bending moment loading applied to the wings can be reduced by reducing the 1 g basis load on at least the outer portions of the wings, rather than trying to instantaneously counteract the varying wind gust loads acting on the wings, during climb and descent phases of flights. By means of suitable deflections of the flaps and/or ailerons during the climb and descent at altitudes below cruise altitude, the lift distribution of the wing over or along the span width is varied or adjusted so as to reduce the bending moments applied to the wing. Specifically, the lift generated by the outer portions of the wings is reduced while the lift generated by the inner portions of the wings is increased, so that the total lift remains the same as it always necessarily corresponds to the weight of the aircraft.

The required flap and aileron deflection angles are dependent only on prescribed flight parameters, such as the flight altitude, the flight speed, and/or the gross flight weight of the aircraft, for example. Thus, it is completely insignificant for the inventive method whether or not a critical wind gust is actually occurring at any given time. If such a wind gust arises, the resulting bending moment load applied to the wings is reduced (as compared to the case without utilizing the inventive method), because the wing has been proactively or preventively placed into the described load reducing configuration.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of reducing the influence of a total load acting on the wings of an aircraft, wherein said total load includes a 1 g basis load and a variable wind gust load, wherein said wings each respectively include an outer wing portion and an inner wing portion, and wherein at least one of said inner and outer wing portions of each one of said wings has a variable lift geometry, said method comprising the following steps:

flying said aircraft in a climb phase from take-off up to a cruising altitude, in a cruise phase substantially at said cruising altitude, and in a descent phase from said cruising altitude down to landing, adjusting said variable lift geometry of each one of said wings to a first configuration during at least a part of said climb phase and at least a part of said descent phase, adjusting said variable lift geometry of each one of said wings to a second configuration during a majority of said cruise phase, and expressly excluding a step of sensing a vertical acceleration of said aircraft or said wings in connection with said adjusting of said variable lift geometry, wherein said first and second configurations in comparison to each other have respective different lift distributions on said inner and outer wing portions, wherein said outer wing portions provide a relatively lower lift in said first configuration and a relatively higher lift in said second configuration, and wherein a portion of said total load acting on said outer wing portions is lower in said first configuration than in said second configuration because a portion of said 1 g basis load acting on said outer wing portions is lower in said first configuration than in said second configuration.

2. The method according to claim 1, further comprising maintaining said variable lift geometry in said first configuration continuously during the entirety of said climb phase and the entirety of said descent phase.

3. The method according to claim 1, wherein each one of said wings respectively includes an aileron provided on said outer wing portion and a flap provided on said inner wing portion, and wherein said step of adjusting said variable lift geometry to said first configuration comprises deflecting at least one of said flap and said aileron on each one of said wings.

4. The method according to claim 3, wherein said step of adjusting said variable lift geometry to said first configuration comprises at least one of symmetrically deflecting said ailerons upward and symmetrically deflecting said flaps downward.

5. The method according to claim 3, wherein said step of adjusting said variable lift geometry to said first configuration comprises symmetrically deflecting said ailerons upward and symmetrically deflecting said flaps downward.

6. The method according to claim 1, wherein said wings are adaptive wings, and wherein said steps of adjusting said variable lift geometry comprise adaptive adjustments of at least said inner portions or said outer portions of said wings.

7. The method according to claim 1, wherein said wings are variable camber wings, and wherein said steps of adjusting said variable lift geometry comprise varying a camber of at least said inner portions or said outer portions of said wings.

8. The method according to claim 1, wherein said aircraft includes an active system for adjusting said variable lift geometry, and said steps of adjusting said variable lift geometry comprise carrying out active adjustments with said active system.

9. The method according to claim 1, further comprising controlling said adjusting of said variable lift geometry to said first configuration and optimizing said first configuration during said climb phase and said descent phase so as to optimize said lift distribution in said first configuration to minimize a total bending moment acting on said wings while minimizing an additional drag caused in said first configuration relative to said second configuration.

10. The method according to claim 1, wherein said step of adjusting said variable lift geometry to said first configuration is carried out responsive to and dependent on at least one parameter selected from a group consisting of the altitude of said aircraft, the flight speed of said aircraft and the gross flight weight of said aircraft.

11. The method according to claim 1, expressly excluding a step of sensing whether a wind gust or a maneuvering load is actually acting on said aircraft.

12. The method according to claim 1, expressly excluding a step of sensing a bending moment acting on said wings in connection with said adjusting of said variable lift geometry.

13. The method according to claim 1, wherein said step of adjusting said variable lift geometry to said first configuration is carried out regardless of whether a wind gust or a maneuvering load is actually acting on said aircraft.

14. The method according to claim 1, further comprising receiving an advance indication that wind gusts are likely to occur during a particular portion of said cruise phase at a location through which said aircraft will be flying, and adjusting said variable lift geometry to said first configuration during said particular portion of said cruise phase responsive to said advance indication.

15. A method of reducing the bending loads acting on the wings of an aircraft including a fuselage, said wings extending from said fuselage, and lift-varying control surfaces on said wings, wherein said control surfaces are adapted to be positioned in a minimum drag cruise configuration, said method comprising:

determining a gust-prone portion of a flight of said aircraft during which wind gusts are likely to act on said aircraft, and regardless whether or not a wind gust or a maneuvering load is actually acting on said aircraft, adjusting said control surfaces into a bending load reduction configuration during said gust-prone portion of said flight, wherein respective outer portions of said wings distal from said fuselage generate a reduced lift and respective inner portions of said wings proximal to said fuselage generate an increased lift in said bending load reduction configuration as compared to said cruise configuration.

16. The method according to claim 15, wherein said gust-prone portion of said flight comprises at least a part of a climb phase from take-off up to a cruise altitude and at least a part of a descent phase from said cruise altitude down to landing, and further comprising maintaining said control surfaces in said bending load reduction configuration continuously throughout said gust-prone portion of said flight.

17. The method according to claim 16, wherein said control surfaces include ailerons provided on said outer portions of said wings and flaps provided on said inner portions of said wings, and wherein said adjusting of said control surfaces into said bending load reduction configuration comprises at least one of deflecting said ailerons symmetrically upward and deflecting said flaps symmetrically downward.

18. The method according to claim 15, excluding sensing whether a wind gust or a maneuvering load is actually acting on said aircraft.

19. The method according to claim 15, wherein said step of adjusting said control surfaces into said bending load reduction configuration is carried out solely dependent on and responsive to said gust-prone portion of said flight and at least one flight parameter selected from the group consisting of the altitude of said aircraft, the flight speed of said aircraft, and the gross flight weight of said aircraft.

20. A method of operating an aircraft including a fuselage, wings extending from said fuselage, and lift-varying control surfaces on said wings, comprising:

flying said aircraft in a climb phase from take-off up to a cruise altitude, while having said control surfaces positioned continuously in a first configuration during at least a part of said climb phase;

flying said aircraft in a cruise phase substantially at said cruise altitude, while having said control surfaces positioned continuously in a second configuration during at least a majority of said cruise phase; and flying said aircraft in a descent phase from said cruise altitude down to landing while having said control surfaces positioned continuously in said first configuration during at least a part of said descent phase;

wherein respective outer portions of said wings distal from said fuselage generate a reduced lift and respective inner portions of said wings proximal to said fuselage generate an increased lift in said first configuration as compared to said second configuration; and wherein said control surfaces are positioned in said first configuration dependent on and responsive to a flight parameter of said flying aircraft and without regard to aerodynamic loads that are actually acting on said aircraft.

* * * * *